May 17, 1938.  L. B. NEIGHBOUR  2,117,494
CORN SHELLER
Filed June 7, 1933  3 Sheets-Sheet 2

INVENTOR
Leonard B. Neighbour
BY Brown, Jackson, Boettcher & Dienner
ATTORNEYS.

WITNESS
Walter Ackerman

Patented May 17, 1938

2,117,494

UNITED STATES PATENT OFFICE 2,117,494

CORN SHELLER

Leonard B. Neighbour, Moline, Ill., assignor to Deere & Company, Moline, Ill., a corporation of Illinois Application June 7, 1933, Serial No. 674,603

22 Claims. (Cl. 130—7)

The present invention relates generally to corn shellers, and more particularly to corn shellers of the cylinder type, and is principally concerned with the provision of a cylinder sheller having improved means for mounting the rotor of the shelling device and having a governor for automatically controlling the speed of the feed elevator and conveyor which delivers corn to the shelling device.

Cylinder shellers are well known in the art and the shelling means of such shellers usually consists of a shelling cylinder formed of a series of adjustable staves or the like in which a rotor revolves. The rotor usually consists of a main shaft on which is keyed a series of shelling beaters or rings which revolve the ears of corn against the staves of the cylinder and, in this way, shell the kernels off the cobs.

The shelling rotor is of appreciable length and for best operation necessarily revolves at considerable speed, in some cases at several hundred revolutions per minute. It is therefore important to have and to maintain the bearings for the rotor in accurate alignment. One of the principal objects, therefore, of the present invention is the provision of means permitting the accurate alignment, both vertically and transversely, of the bearings for the main shaft of the rotor on the frame of the sheller. More specifically, another object of the present invention is the provision of means for mounting the rotor and bearing means therefor which is so constructed and arranged that any distortion of the sheller frame will not be effective in throwing the bearings for the rotor out of proper alignment. As is apparent, agricultural implements generally are frequently subjected to hard usage so that at times there is a tendency to distort the frames of such implements. By the present invention, however, distortions of the sheller frame will not cause the bearings of the rotor shaft to bind or otherwise get out of alignment.

Another important object of the present invention is the provision of a sheller having governor mechanism for controlling the delivery of ears of corn to the sheller in accordance with the capacity of the latter to handle the material delivered thereto. More specifically, the present invention contemplates a construction embodying a governor mechanism arranged to control the operation of the feeder in accordance with the rate of rotation of the sheller. According to the present invention, the feeder is equipped with a governor which is arranged to disengage the feeder when the sheller speed drops below normal. After the sheller again gets up to normal speed, the governor mechanism automatically throws the feeder into gear so as to again deliver corn to the sheller. This prevents overloading the cylinder when the sheller is running too slow to handle the corn properly.

Still further, another important object of the present invention, particularly in connection with the above mentioned improved mounting for the rotor shaft, is the provision of improved driving connections to the several operating mechanisms of the sheller other than the rotor or beater, these connections being such that the other mechanisms are not effected by possible changes in the position of the rotor shaft, whereby to maintain alignment of the bearings, even though the present invention contemplates driving the other mechanisms from that shaft.

These and other objects of advantages of the present invention will be apparent to those skilled in the art after a consideration of the following detailed description of the preferred structure in which the principles of the present invention have been embodied, taken in conjunction with the accompanying drawings illustrating such construction.

Figure 1:
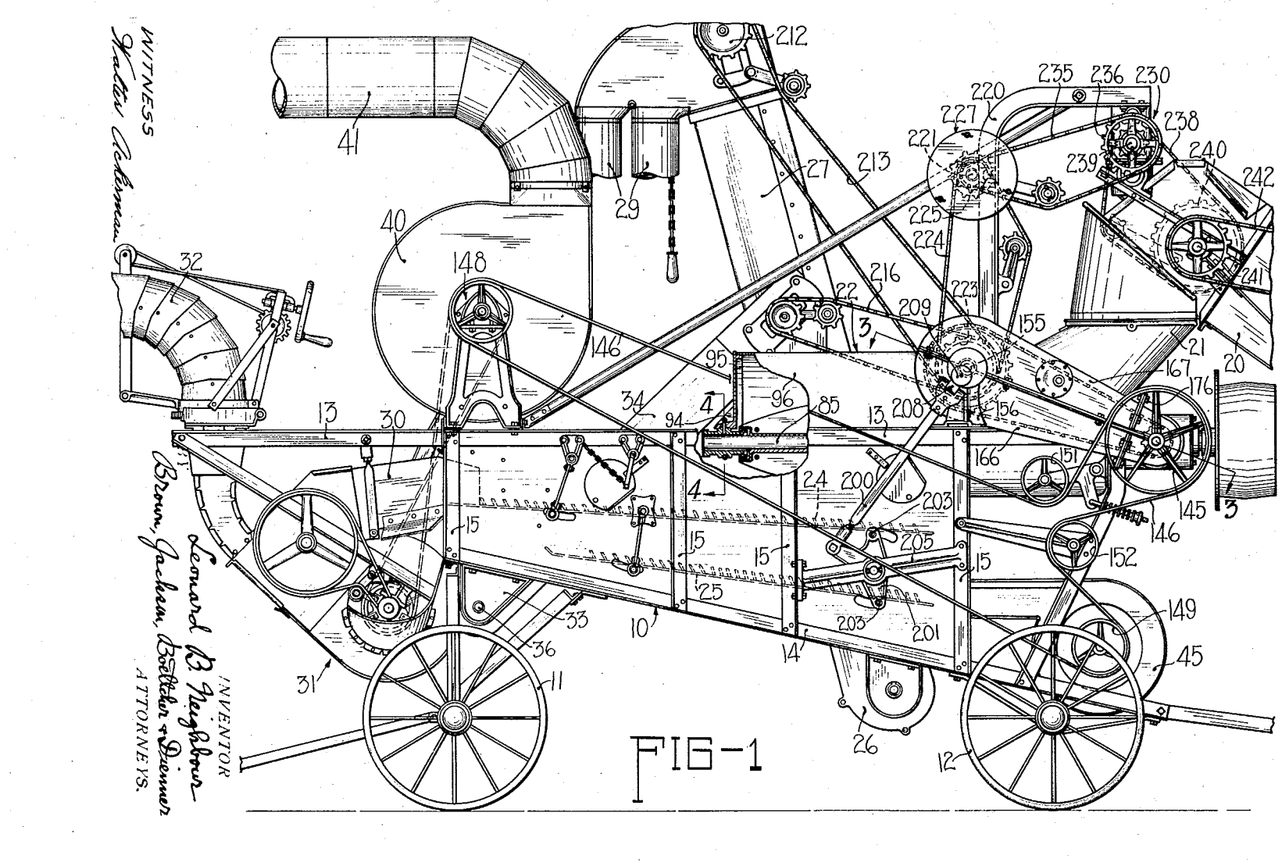
Figure 1 is a side elevation of a cylinder sheller embodying the principles of the present invention.

Referring now more particularly to Figure 1, the cylinder sheller shown is, in many respects, of the conventional type, and hence it is deemed unnecessary to show in detail all of the operating mechanism of the sheller. Generally speaking, the sheller consists of a frame 10 supported on front and rear wheels 11 and 12 and consisting of a plurality of longitudinal bars 13 and 14 and a plurality of vertical bars 15. At the rear end of the machine a swinging ear corn feeder 20 is provided which delivers the corn to a feed hopper 21 from which the corn is directed to a shelling device mounted on the rear of the frame and indicated in its entirety by the reference numeral 22. The shelled corn from the shelling device 22 is deposited onto the rear end of a vibrating shoe 24 while the cobs are deposited on the front portion of the shoe 24. The shoe 24 conveys the cobs forwardly of the machine by its reciprocating movement, while the shelled corn drops through the shoe 24 onto a cleaning shoe 25. Disposed underneath the cleaning shoe 25 is the boot 26 of an elevator 27. The elevator 27 serves to elevate the shelled corn and to deliver the same to wagons or to other elevators or containers through a divided spout 29.

The cobs which pass over the front end of the cob shoe 24 are conducted by means of a chute 30 into a cob blower 31 by which they are conveyed through a chute or stack 32 to a convenient point away from the sheller. The present invention is not particularly concerned with the specific details of the cob blower 31, the same being fully disclosed and claimed in the copending application of Arthur B. Dieterich, Serial No. 676,055, filed June 16, 1933. The small broken parts of the cobs which pass through the cob shoe 18 and which fall onto the cleaning shoe 25 are conveyed forwardly by the latter toward the front of the machine and into the boot 33 of an elevator mechanism 34. The elevator mechanism 34 includes a screw conveyor within the boot 33, as indicated by the reference numeral 36. Thus, the small broken cob parts and such corn as is carried over the end of the cleaning shoe 25 are conveyed upwardly and rearwardly of the machine and back into the latter where they are again deposited onto the cob shoe 24.

The husks, silks and other like materials are removed from the cobs by means of a suction fan 40 disposed at the front end of the sheller and supported on the frame 10. The suction fan 40 induces a draft through and around the cob shoe 24 and conveys the husks, silks and the like away from the machine through a chute or conduit 41 to a convenient point away from the machine. In this connection, the exhaust fan is aided by a blast fan 45 disposed at the rear end of the machine and arranged to subject the shelled corn passing downwardly from the shoes 24 and 25 to the elevator boot 26 to a strong blast of air which takes out all silks, chaff, cob ends and the like, the cobs and other heavier objects being delivered through the chute 30 while the dust, dirt, husks and the like are picked up by the exhaust fan 40 and delivered through the conduit 41.

Figures 2, 3, 4:
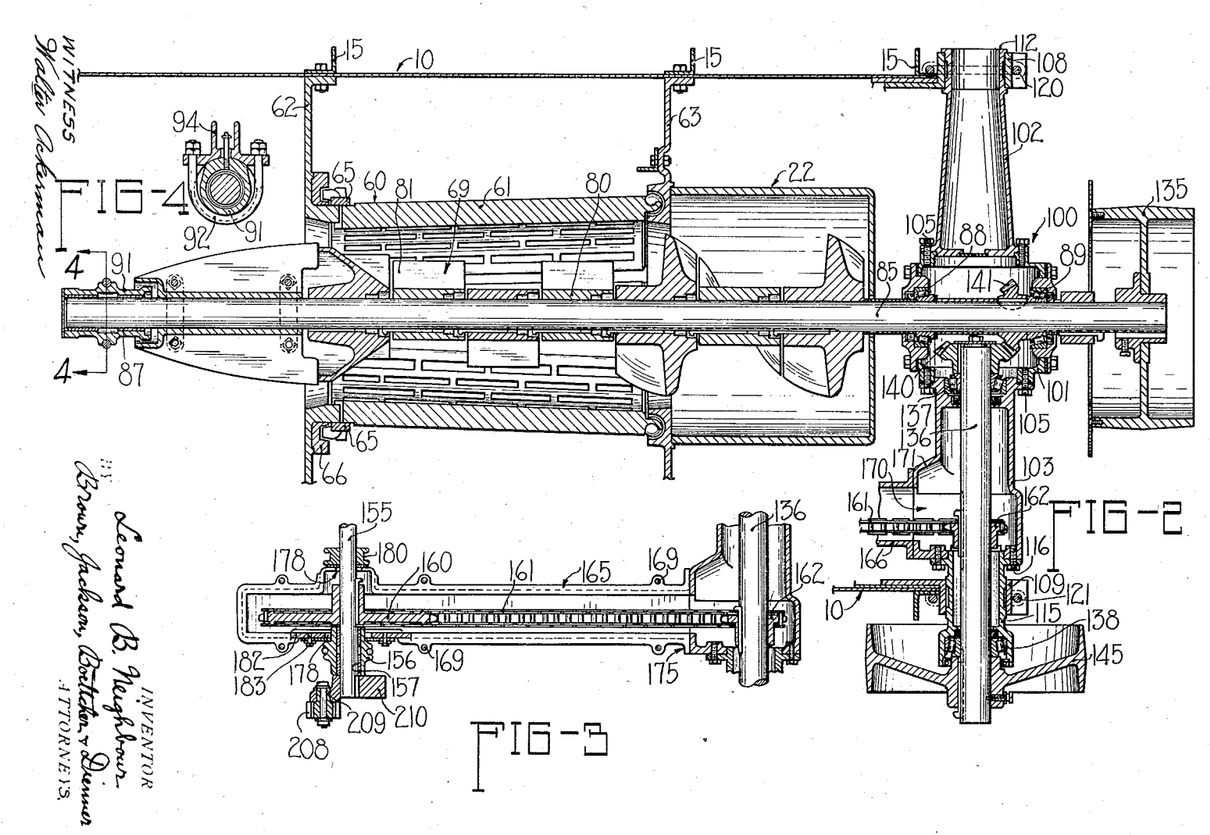
Figure 2 is a fragmentary section taken on an enlarged scale and showing in detail the shelling cylinder, the rotor and main drive shaft therefor, and the supporting bearing means for the latter.
Figure 3 is a section taken along the line 3—3 of Figure 1 and showing certain portions of the connections between the driving means for the rotor and the other operating mechanisms of the sheller.
Figure 4 is a section taken along the line 4—4 of Figure 2.

The shelling device 22 consists of a shelling cylinder 60 comprising a plurality of shelling staves 61 formed as cylindrical segments and supported at their ends on transverse frame members 62 and 63 suitably connected with the sheller frame 10. At one end the staves or grates 61, forming the shelling cage or cylinder 60, rest in sockets formed in the transverse frame or supporting member 63. The other end of each of the staves 61 is secured, by means of a detachable lug 65, to an adjustable ring member 66 having eccentric grooves in which the stave lugs 65 are disposed. Suitable means (not shown) are provided for adjusting the ring 66 so as to increase and decrease the size of the shelling cylinder at the discharge end thereof.

A shelling rotor 69 is disposed for rotation within the cylinder 60 and comprises a series of rotor sections or shelling beaters, each section comprising a hub member 80 and two vanes 81 extending substantially radially therefrom. The rotor sections or shelling beaters are keyed or otherwise secured to a longitudinally disposed main drive shaft 85 which is journaled in bearings 87, 88 and 89. The bearing 87 is supported by a journal sleeve 91, see Figure 4, supported by means of a U-bolt 92 or the equivalent which is secured to a projecting portion 94 of a casting or transverse member 95 which is mounted forward of the frame member 62 and which closes the rear or discharge end of the housing or removable cover 96 that encloses the shelling device and is removable from the sheller frame to permit inspection of the shelling mechanism. It will be noted that the rear or discharge end of the shelling device 22 extends forwardly with respect to the direction of road travel of the machine.

As best shown in Figure 2, the bearings 88 and 89 are spaced apart and are supported in a tubular housing 100. The housing is made up of a central section 101 and sleeve portions 102 and 103 secured thereto by cap screws 105 or the equivalent. The housing 100 is journaled at its opposite ends in bearings 108 and 109 provided on the frame 10 of the sheller, the sleeve portion 102 being provided with an integral bearing portion 112 which is received within the bearing 108 and the other sleeve 103 is provided with a separate member 115 suitably fixed thereto by cap screws 116 and is supported within the bearing portion 109.

By virtue of this mounting, the housing 100 may pivot about an axis which is perpendicular to the axis of the main drive shaft 85 so as to automatically align the bearings 88 and 89 with the bearing 87 at the other end of the shaft, the pivotal movement of the housing 100 serving to align these bearings in a vertical plane. To align the bearings horizontally, the bearings 108 and 109 may be shifted with respect to the sheller frame 10. The housing 100 is held in position by means of U-bolts 120 and 121 which embrace the bearing portions 112 and 115 and are bolted, respectively, to the bearings 108 and 109.

Power is transmitted to the sheller by means of a belt pulley 135 fixed to one end of the shaft 85 which extends through the housing 100. The remaining portion of the sheller mechanism receives power from a jack shaft 136 which is journaled for rotation within the housing 100 about an axis which coincides with the pivot axis of the housing and which extends substantially at right angles to the main drive shaft 85 and is suitably geared thereto.

The jack shaft 136 is supported within the housing 100 by a bearing 137 carried at the inner end of the sleeve portion 103 and in a bearing 138 carried in the outer end of the section 115. The inner end of the jack shaft 136 is provided with a bevel gear 140 fixed thereto and meshing with a bevel gear 141 keyed or otherwise secured to the main drive shaft 85. The bevel gears 140 and 141 are best mounted within the central housing section 101 between the spaced bearings 88 and 89. The space within the housing section 101 is made leak-tight so as to retain lubricant therein, whereby the gears 140 and 141 and the bearings 88, 89 and 137 are lubricated.

For driving the suction fan 40 and the blast fan 45 a belt pulley 145 is mounted on the outer end of the jack shaft 136 and is connected by means of a belt 146 with a pulley 148 on the shaft of the suction fan 40 and a pulley 149 on the shaft on the blower 45. Preferably, the belt 146 also passes around two idler pulleys 151 and 152.

For driving the feeder 20, the shoes 24 and 25, and the elevators 27 and 34, a second jack shaft 155 is journaled in suitable standards 156 mounted on the upper longitudinal frame bars 13. The jack shaft 155 is supported in the standards 156 by suitable bearings 157, and the jack shaft 155 carries a sprocket wheel 160 keyed or otherwise secured thereto. The sprocket wheel 160 is driven by a sprocket chain 161 trained thereover and over a sprocket pinion 162 fixed to the jack shaft 136, as best shown in Figures 2 and 3. The sprocket 160 and sprocket chain 161 are housed in a two-part housing 165, and the two sections of the housing, indicated by the reference numerals 166 and 167 in Figure 1, are bolted together by means of bolts 169. The two housing sections are bolted over a flanged opening 170 formed in a short extension 171 of the housing section 103. The portions of the housing sections 166 and 167 are also flanged, as at 175, to accommodate the attaching bolts 176, as best shown in Figure 1.

Adjacent the sprocket 160 and the jack shaft 155, the housing sections 166 and 167 are provided with openings 178 to accommodate the jack shaft 155 and the bearings therefor. The openings are somewhat larger than the diameter of the jack shaft 155 and the bearing means associated therewith to allow for the pivotal movement of the housing 100 in its bearings 108 and 109, since the housing 165 is rigidly bolted to the housing section 103 and hence swings with the housing 100 as the latter pivots in aligning the bearings 87, 88 and 89.

The space between the opening 178 and the jack shaft 155 enclosed by means of a collar 180 fixed onto the shaft 155, and the space between the opening 178 and the bearing 157 and associated supporting standard is closed by means of a shield 182 suitably fixed to the housing 165 by means of cap screws 183 projecting through enlarged perforations therein by virtue of which the shield or plate 182 may have relative movement with respect to the housing 165 to accommodate the pivotal motion or adjustment of the housing 100.

As mentioned above, the feeder 20, the elevators 27 and 34, and the shoes 24 and 25 are all driven from the jack shaft 136, and to this end these sheller mechanisms are connected with the jack shaft 155. The shoes 24 and 25 are oscillated by means of a pitman 200 pivotally connected with a rocking member 201 with which the shoes 24 and 25 are pivotally connected, as at 202 and 203, and which is pivotally supported upon brackets 205 connected with one or more of the sheller frame members. The upper end of the pitman 200 is pivotally connected with a coupling member 208 which is provided with a crank pin portion 209 carried by a crank arm 210 keyed or otherwise fixed to the end of the jack shaft 155.

The grain elevator 27 is driven from the jack shaft 155 through a chain and sprocket connection therewith, including a sprocket 212 and a sprocket chain 213, the latter being driven from a sprocket fixed onto the jack shaft 155. The elevator 34 is also driven from the jack shaft 155 through a chain and sprocket connection including a sprocket chain 216.

The feed elevator 20 and the feed conveyor are driven from the jack shaft 155 by mechanism which will now be described. The upper portion of the sheller frame 10 carries upwardly disposed frame bars 220 which are provided with suitable brackets and bearings supporting a third jack shaft 221 in a position substantially directly above the jack shaft 155. The shaft 221 is driven from the shaft 155 through a driving connection which includes a sprocket 223 fixed to the jack shaft 155, a sprocket chain 224 and a sprocket 225 fixed to the shaft 221 at one end of the latter, as shown in Figure 6.

From the jack shaft 221 the drive is transmitted through a governor mechanism, indicated in its entirety by the reference numeral 227, and suitable sprockets and driving chains to the swivel drive jack or feeder head 230. The governor mechanism will be described later, but it will be noted at this point, as best shown in Figure 6, that the governor mechanism 227 drives a three sprocket element 233 journaled on the jack shaft 221. A sprocket chain 235 trained over one of the relatively large sprockets 233 drives a sprocket 236 forming a part of the swivel feeder head 230, and a sprocket chain 238 is driven from the swivel drive shaft 239 and, in turn, drives the feed elevator through a large sprocket 240 secured to a feed shaft 241. Thus the feed shaft 241 is driven from the governor mechanism at a comparatively slow speed, the speed reduction between the shafts 221 and 241 being in excess of two to one. The feed conveyor (not shown) is driven from the feed shaft 241 by means of a sprocket chain 242.

Figures 5, 6:
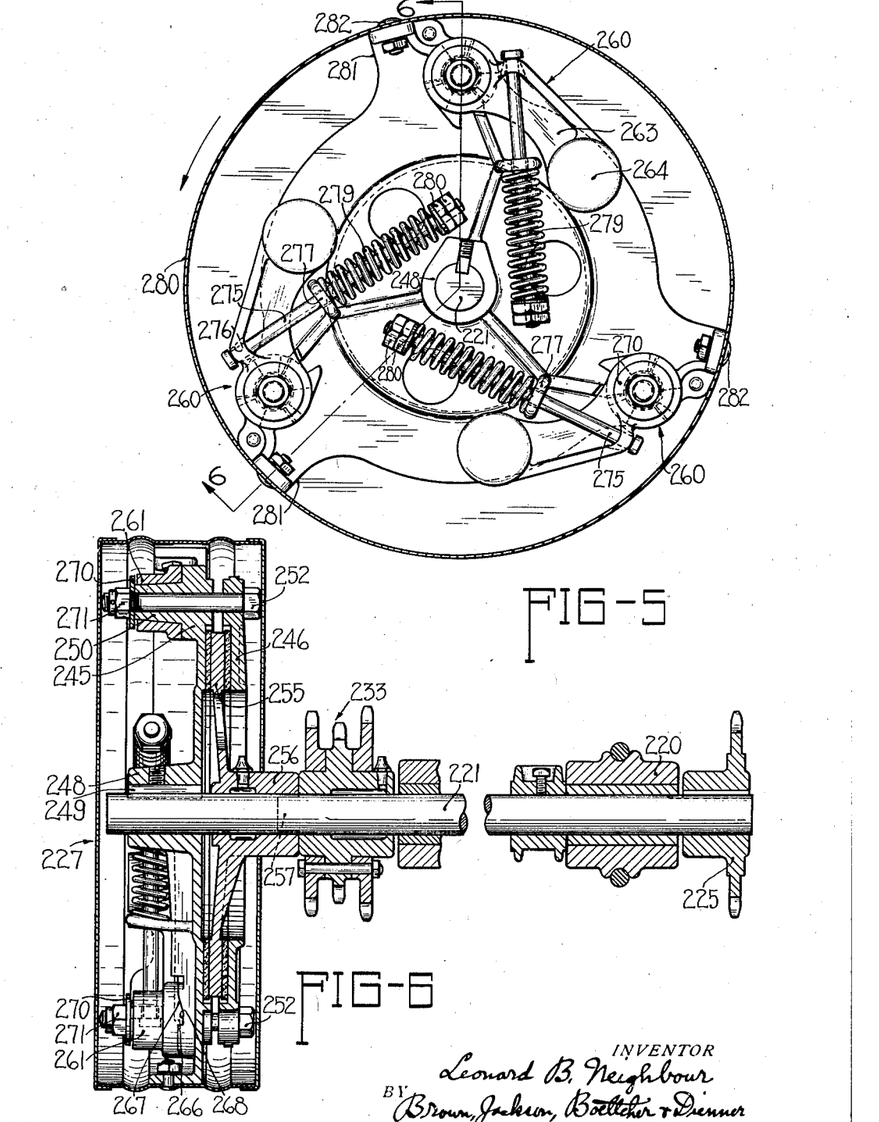
Figure 5 is a vertical section taken through the governor mechanism.
Figure 6 is a section taken along the line 6—6 of Figure 5.

Referring now more particularly to Figures 5 and 6, the governor mechanism 227 by which the sprocket element 233 is driven from the jack shaft 221 comprises a governor controlled clutch which is made responsive to the speed of the shelling device 22 through its connection with the jack shaft 155, the latter being driven from the main drive shaft 85 of the shelling device as described above. The governor controlled clutch comprises a pair of driving clutch plate members 245 and 246 rotatable with the jack shaft 221. The clutch member 245 includes a hub portion 248 which is secured by means of a key 249 to the jack shaft 221 and is provided with a series of circumferentially spaced apertured bosses 250 carried by the rim of the clutch member 245. The clutch member 246 is mounted for relative axial movement with respect to the clutch member 245 but is connected to be rotated therewith by a plurality of bolts 252 carried by the clutch member 246 and slidably received within the bosses 250, as best shown in Figure 6.

A driven clutch member 255 is disposed between the clutch plates 245 and 246 and is provided with a hub portion 256 journaled on the jack shaft 221 and provided with one or more notches to receive lugs 257 carried by or formed on the sprocket 233. By virtue of this construction, whenever the driven clutch plate 255 is rotated the sprocket member 233 is likewise rotated and drives the feeder 20.

The driven clutch member 255 is adapted to be frictionally engaged between the driving clutch plates 245 and 246, and the relative movement between the driving clutch plates, by virtue of which the frictional engagement is established, is controlled by a plurality of governor elements. Three governor elements are shown but it is to be understood that a greater or lesser number of elements may be provided if desired. Each governor element, indicated by the reference numeral 260, comprises a sleeve portion 261 journaled over the associated boss 250, a governor arm 263, and a weight 264 secured thereto or formed on the arm 263. As best shown in Figure 6, the base portion of each of the sleeves 261 is provided with axially extending lugs 266 having one side thereof beveled, as shown at 267. The lugs 266 engage in correspondingly shaped recesses 268 in the clutch plate 245, these portions forming cam elements by which a pull is exerted on the bolts 252 whenever the weighted arms 263 are swung outwardly under the influence of centrifugal force. The sleeve portions 261 engage washers 270 carried by the threaded ends of the bolts 252 and held in place by nuts 271.

Each of the weighted governor arms is yieldingly held in the retracted position shown in Figures 5 and 6 by means of an elongated bolt 275 which projects through an enlarged aperture 276 formed in the flange of the arm and through an aperture in a lug 277 formed integral with the clutch plate 245, there being a coil spring 279 embracing the inner end of the bolt 275 and biased between the lugs 277 and lock nuts 280 on the end of the bolt.

The clutch and governor mechanism is enclosed by a sheet metal housing 280 which is carried upon extension 281 formed on the clutch plate 245 and to which the housing 280 is bolted by means of bolts 282.

When the shaft 221 is rotating, the governor elements 260 will be swung outwardly radially of the axis of the shaft 221 and will be cammed axially of the bosses 250 by virtue of the formation of the lugs 266 and the recesses 267. Axial movement of the weighted governor arms 260 will exert a pull through the washers 270 and nuts 271 on the bolts 252, this operation serving to draw the clutch plate 246 against the driven clutch plate 255 and to draw the latter against the clutch plate 245, thereby establishing frictional engagement therebetween. When the weighted governor arms swing outwardly with sufficient force, an effective driving connection is established between the shaft 221 and the sprocket element 233 journaled thereon, the governor clutch being so designed that when the shaft 221 is operated at the proper speed, the governor elements will hold the clutch plates 245 and 246 in driving engagement with the driven clutch plate 255. Since the jack shaft 221 is rotated by suitable connections from the jack shaft 136, and since the latter is rotated directly by the main drive shaft 85, the jack shaft 221 will thus be driven at a speed proportional to the speed of rotation of the rotor of the shelling device.

Since it is undesirable to feed corn to the sheller unless the shelling device is rotating at a speed at which shelling can be efficiently accomplished, the interposition of governor mechanism in the driving connections between the sheller shaft and the feeder mechanism serves the very important purpose of preventing the operation of a feeder unless the shelling device is operated at the proper speed. When this speed has been attained, driving connection is established through the governor clutch 227 and the feeder operated to direct corn to the shelling device. When the speed of the latter falls below its proper operating speed, the governor elements are drawn inwardly by the springs 279 to interrupt the drive to the feeder, the radially inward movement of the governor arms serving to permit the clutch plates 245 and 246 to separate, thereby releasing the frictional driving engagement between these plates and the driven clutch plate 255. This release will cause the feed elevator 20, and the feed conveyor driven thereby, to run slower or to cease operating and to thereby feed less corn to the sheller. After the sheller has again regained its speed, the feed conveyor and feed elevator will again be driven at their normal speed.

In order that the governor mechanism shall revolve at sufficiently high speed to secure proper operation thereof, the sprocket 223 is somewhat larger than the sprocket 225, and hence the shaft 221 is rotated at a speed somewhat greater than the speed of the drive shaft 155. In this way the governor mechanism need not be provided with excessively heavy weighted arms. On the other hand, the feeding mechanism requires relatively high torque to drive the same and is, at the same time, a comparatively slow speed unit. The proper driving ratio for the feeder 230 is secured by properly proportioning the sprockets 233, 236 and 240 and associated mechanisms, as mentioned above. An important feature of the present invention is, therefore, the use of a relatively high speed governor geared down to control the relatively low speed feeder shaft of a corn sheller.

It is important to note that the governor mechanism 227 and the other driving connections are so arranged that they are not affected by any movement of the housing 100 in lining up the bearings 87, 88 and 89.

While I have described above the preferred construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a corn sheller or similar machine subjected to twisting strains, the combination of a frame, a rotatable shaft, bearing means for one end of said shaft carried by said frame, two axially spaced bearing means for the other end of said shaft arranged in alignment with said first bearing to support said shaft for free rotation on said frame, and means for supporting said two spaced bearing means on said frame to maintain their alignment with said first bearing means and comprising a support carried by said frame for limited rocking movement about an axis passing between said two spaced bearing means whereby distortion of the frame will not bind said shaft and the pressure on one of said two bearing means tending to rock said supporting means about said axis is substantially balanced by the tendency of the pressure on the other of said two bearing means to rock the supporting means in the opposite direction.

2. A corn sheller comprising a frame, shelling means including a rotor shaft journaled on said frame, bearing means for one end of said shaft, bearing means for the other end of said shaft, said last named bearing means including a housing supported on said frame for rocking movement about an axis disposed transversely with respect to the axis of said shaft, a feeder for delivering corn to said shelling means and means including a separately mounted jack shaft deriving power from said rotor shaft for driving said feeder.

3. A corn sheller comprising, in combination, a frame, a shelling cylinder supported thereby, a rotatable shaft disposed therein, bearing means supporting one end of said shaft, a transversely disposed housing supporting the other end of said shaft and having a central section and separate laterally directed sections secured thereto, means for supporting the laterally directed sections of said housing directly on said frame for rocking movement about an axis perpendicular with respect to said shaft, and bearing means for said other end of the shaft carried by said central section of the housing.

4. A corn sheller comprising, in combination, a frame having longitudinal frame bars, a shelling cylinder supported thereby, a rotor shaft disposed within said cylinder, bearing means for one end of said shaft, means for supporting said bearing means comprising a transversely disposed housing supported directly on said frame bars for rocking movement about an axis transverse with respect to said shaft, a second shaft disposed within said housing, bearing means supporting said second shaft therein concentrically with respect to the axis about which the housing is adapted to rock, and gear means mounted within said housing and serving to operatively connect said shafts.

5. In a corn sheller, a frame, a shelling cylinder supported by said frame, a rotor disposed within said cylinder, a shaft on which said rotor is mounted, a bearing supported on said frame in which one end of said shaft is mounted, a housing supported on said frame for rocking movement about an axis perpendicular to said shaft and for lateral shifting movement relative to the frame, two spaced bearings in said housing in which the other end of said shaft is journaled, a second shaft disposed in a position of said housing for rotation about an axis coinciding with the axis of rocking movement of said housing, and bevel gear means connecting said shafts and disposed in said housing between said spaced bearings.

6. In a corn sheller, a frame, a shelling cylinder supported by said frame, a rotor disposed within said cylinder, a shaft on which said rotor is mounted, a bearing supported on said frame in which one end of said shaft is journaled, a housing supported on said frame for rocking movement about an axis perpendicular to said shaft, two spaced bearings in said housing in which the other end of said shaft is journaled, a jack shaft journaled in said housing for rotation about an axis concentric with the axis about which said housing may rock, means carried by said first shaft adjacent said spaced bearings for rotating said first shaft, and means for rotating said jack shaft from said first shaft including a bevel gear mounted on said first shaft between said two spaced bearings and a second bevel gear meshing with said first bevel gear and mounted on said jack shaft.

7. In a corn sheller, a frame, a shelling cylinder supported by said frame, a rotor disposed within said cylinder, a shaft on which said rotor is mounted, a bearing supported on said frame in which one end of said shaft is journaled, a housing supported on said frame for rocking movement about an axis perpendicular to said shaft, two spaced bearings in said housing in which the other end of said shaft is journaled, a jack shaft journaled in said housing for rotation about an axis concentric with the axis about which said housing may rock, means carried by the first shaft adjacent said spaced bearings for rotating said first shaft, means for rotating said jack shaft from said first shaft including a bevel gear mounted on said first shaft between said two spaced bearings and a second bevel gear meshing with said first bevel gear and mounted on said jack shaft, cleaning mechanism for the sheller, and means for operating said cleaning mechanism including a driving connection with said jack shaft.

8. In a corn sheller, a frame, a shelling cylinder supported by said frame, a rotor disposed within said cylinder, a shaft on which said rotor is mounted, a bearing supported on said frame in which one end of said shaft is journaled, a housing supported on said frame for rocking movement about an axis perpendicular to said shaft, two spaced bearings in said housing in which the other end of said shaft is journaled, a jack shaft journaled in said housing for rotation about an axis concentric with the axis about which said housing may rock, means for rotating said first shaft, means for rotating said jack shaft from said first shaft including a bevel gear mounted on said first shaft between said two spaced bearings and a second bevel gear meshing with said first bevel gear and mounted on said jack shaft, cleaning mechanism for the sheller, means for operating said cleaning mechanism including a driving connection with said jack shaft, said driving connection including a second jack shaft journaled on said frame, a sprocket on each of said jack shafts, and a chain trained over said sprockets.

9. In a corn sheller, a frame, a shelling cylinder supported by said frame, a rotor disposed within said cylinder, a shaft on which said rotor is mounted, a bearing supported on said frame in which one end of said shaft is journaled, a housing supported on said frame for rocking movement about an axis perpendicular to said shaft, two spaced bearings in said housing in which the other end of said shaft is journaled, a jack shaft journaled in said housing for rotation about an axis concentric with the axis about which said housing may rock, means for rotating said first shaft, means for rotating said jack shaft from said first shaft including a bevel gear mounted on said first shaft between said two spaced bearings and a second bevel gear meshing with said first bevel gear and mounted on said jack shaft, cleaning mechanism for the sheller, means for operating said cleaning mechanism including a driving connection with said jack shaft, said driving connection including a second jack shaft journaled on said frame and connecting means operatively connecting said jack shafts, and a second housing enclosing said connecting means and fixed to said first housing, said second jack shaft extending through openings in said second housing, said openings being substantially larger than said second jack shaft to provide for rocking movement of said first housing.

10. In a corn sheller, a frame, a shelling cylinder supported by said frame, a rotor disposed within said cylinder, a shaft on which said rotor is mounted, a bearing supported on said frame in which one end of said shaft is journaled, spaced bearings for the other end of said shaft, a housing supporting said bearings, and journal means supporting said housing on said frame for limited rocking movement with respect thereto about an axis disposed transversely with respect to the axis of said shaft, said journal means being shiftable laterally in said frame to align said spaced bearings with said first named bearing.

11. In a corn sheller, a frame, a shelling cylinder supported by said frame, a rotor disposed within said cylinder, a shaft on which said rotor is mounted, a bearing supported on said frame in which one end of said shaft is journaled, a housing supported on said frame for rocking movement about an axis perpendicular to said shaft, two spaced bearings in said housing in which the other end of said shaft is journaled, a jack shaft journaled in said housing for rotation about an axis concentric with the axis about which said housing may rock, means for rotating said first shaft, means for rotating said jack shaft from said first shaft including a bevel gear mounted on said first shaft between said two spaced bearings and a second bevel gear meshing with said first bevel gear and mounted on said jack shaft, cleaning mechanism for the sheller, means for operating said cleaning mechanism including a driving connection with said jack shaft, feeding mechanism for feeding ears of corn to said shelling cylinder, and means for driving said feeding mechanism from said jack shaft and including a governor mechanism operative to interrupt the drive to said feeding mechanism according to the speed of said rotor.

12. A corn sheller comprising a frame, shelling means including a rotor shaft journaled on said frame, bearing means for one end of said shaft, bearing means for the other end of said shaft, means for supporting said last named bearing means including a housing supported directly on said frame for rocking movement about an axis disposed transversely with respect to the axis of said shaft, a feeder for delivering corn to said shelling means, and means including a jack shaft carried by said housing and deriving power from said rotor shaft for driving said feeder.

13. A corn sheller comprising a farme, shelling means including a rotor shaft journaled on said frame, bearing means for one end of said shaft, bearing means for the other end of said shaft, means for supporting said last named bearing means including a housing supported directly on said frame for rocking movement about an axis disposed transversely with respect to the axis of said shaft, a feeder for delivering corn to said shelling means, and means deriving power from said rotor shaft for driving said feeder and including a jack shaft carried principally by one end of said housing and a gear set in said housing connecting said jack shaft with said rotor shaft.

14. A corn sheller comprising a frame, a rotatable shaft, bearing means supporting one end of said shaft for rotation on said frame, a pair of axially spaced bearings for the other end of said shaft, and a hollow housing having a central portion receiving said other end of the shaft and supporting said axially spaced bearings, said housing having tubular supporting portions bolted to said central portion and extending transversely to said shaft and rockably supported on said frame, whereby said spaced bearings can be aligned with said first bearing means.

15. An agricultural machine comprising a frame, a rotatable shaft, bearing means supporting one end of said shaft for rotation on said frame, a pair of axially spaced bearings for the other end of said shaft, a hollow housing having a central portion receiving said other end of the shaft and supporting said axially spaced bearings, said housing having supporting portions extending transversely to said shaft and rockably supported on said frame, the axis of rocking movement of said housing passing substantially midway between said spaced bearings, and a drive pulley secured to said shaft adjacent said axially spaced bearings.

16. An agricultural machine comprising a frame, a rotatable shaft, bearing means supporting one end of said shaft for rotation on said frame, a pair of axially spaced bearings for the other end of said shaft, a hollow housing having a central portion receiving said other end of the shaft and supporting said axially spaced bearings, said housing having supporting portions extending transversely to said shaft and rockably supported on said frame, whereby said spaced bearings can be aligned with said first bearing means, a second shaft disposed transversely with respect to said first shaft and carried by one of said rockably supported portions, and gear means operatively connecting said shafts and disposed in said central portion of the housing.

17. In a corn sheller, a shelling mechanism, a shaft operatively connected therewith, a pulley on the shaft for driving the shelling mechanism at a relatively rapid rate, a jack shaft, means for driving said jack shaft from said first shaft at a reduced rate, an operating unit operated by said jack shaft, governor mechanism, means for driving the governor mechanism from said jack shaft at a rapid rate, a feeding mechanism for feeding ears of corn to said shelling mechanism, and means controlled by said high speed governor mechanism for driving said feeding mechanism at a relatively low rate.

18. In a corn sheller, a shelling mechanism, a shaft operatively connected therewith, a pulley on the shaft for driving the shelling mechanism at a relatively rapid rate, a jack shaft, means for driving said jack shaft from said first shaft at a reduced rate including a small sprocket driven from the sheller shaft and a relatively large sprocket on said jack shaft, means including cleaning and elevating mechanism driven from said slow speed jack shaft, high speed governor mechanism, means for driving the governor mechanism from said jack shaft at a rapid rate including a large sprocket on said jack shaft and a small sprocket for the governor mechanism, a feeding mechanism for feeding ears of corn to said shelling mechanism, and means controlled by said high speed governor mechanism for driving said feeding mechanism at a relatively low rate including a small sprocket driven by the governor mechanism and a relatively large sprocket associated with the feeding mechanism.

19. In a corn sheller or similar machine subjected to twisting strains, the combination of a frame, a rotatable shaft disposed longitudinally of said frame, an operating part carried by and imposing its weight on said shaft intermediate the ends of the latter, bearing means for one end of said shaft carried by said frame, two axially spaced bearing means for the other end of said shaft arranged in alignment with said first bearing to support said shaft for free rotation on said frame, a tubular section disposed about said other end of the longitudinal shaft and receiving said two bearing means in axially spaced relation, and a pair of generally laterally directed members connected at their inner ends with said tubular member and rockably mounted on the frame at the outer ends for movement about a generally transverse axis that passes between said two spaced bearing means, whereby distortion of the frame will not bind said shaft and the pressure on one of said two bearing means tending to rock said tubular member about said transverse axis is substantially balanced by the tendency of the pressure on the other of said two bearing means to rock the tubular member in the opposite direction.

20. In a corn sheller or similar machine subjected to twisting strains, the combination of a frame, a rotatable shaft disposed longitudinally of said frame, an operating part carried by and imposing its weight on said shaft intermediate the ends of the latter, bearing means for one end of said shaft carried by said frame, two axially spaced bearing means for the other end of said shaft arranged in alignment with said first bearing to support said shaft for free rotation in said frame, generally tubular means for supporting said two spaced bearing means on said frame to maintain their alignment with said first bearing means and comprising a transverse support on said frame for limited rocking movement about a transverse axis passing between said two spaced bearing means whereby distortion of the frame does not bind said shaft and the pressure on one of said two bearing means tending to rock said supporting means about said transverse axis is substantially balanced by the tendency of the pressure on the other of said two bearing means to rock the supporting means in the opposite direction, a second rotatable shaft supported in said generally tubular means in alignment with the transverse axis about which said tubular means is rockable relative to the frame, and means operatively connecting the inner end of said second shaft with the said longitudinal shaft.

21. In a corn sheller or similar machine, the combination of a frame, a rotatable shaft, bearing means for one end of said shaft carried by said frame, two axially spaced bearing means for the other end of said shaft arranged in alignment with said first bearing to support said shaft for free rotation on said frame, means for supporting said two spaced bearing means on said frame to maintain their alignment with said first bearing means and comprising a support carried by said frame for limited rocking movement about an axis passing between said two spaced bearing means whereby distortion of the frame will not bind said shaft and the pressure on one of said two bearing means tending to rock said supporting means about said axis is substantially balanced by the tendency of the pressure on the other of said two bearing means to rock the supporting means in the opposite direction, a second shaft journaled for rotation in said supports in axial alignment with the axis of limited rocking movement thereof and terminating adjacent the end of said rotatable shaft supported by said two axially spaced bearing means, and means operatively connecting the inner end of said second shaft with said first mentioned shaft.

22. A corn sheller comprising a frame, shelling mechanism, means for driving said shelling mechanism at a relatively rapid rate, upwardly extending feeder supporting bars secured to said frame, a swivel feeder supported at the upper ends of said bars for feeding ears of corn to said shelling mechanism, said feeder including a plurality of comparatively low speed interconnected shafts, a shaft journaled on said bars and normally driven at a speed higher than that of any of said low speed shafts, means for driving said high speed shaft from said shelling mechanism driving means, and means for connecting said high speed shaft with said swivel feeder and including means for disconnecting the swivel feeder when the speed of said shelling mechanism decreases below a predetermined value.

LEONARD B. NEIGHBOUR.

CERTIFICATE OF CORRECTION.

Patent No. 2,117,494.  May 17, 1938.

LEONARD B. NEIGHBOUR.

It is hereby certified that error appears in the printed specification of the above numbered patent requiring correction as follows: Page 3, second column, line 23, strike out the words "relatively large" and insert the same before "sprocket" in line 24; and that the said Letters Patent should be read with this correction therein that the same may conform to the record of the case in the Patent Office.

Signed and sealed this 5th day of July, A. D. 1938.

Henry Van Arsdale,
Acting Commissioner of Patents.

(Seal)